(12) United States Patent
Sunor et al.

(10) Patent No.: US 12,386,844 B2
(45) Date of Patent: Aug. 12, 2025

(54) TEMPORAL REASONING

(71) Applicant: Apple Inc., Cupertino, CA (US)

(72) Inventors: Fatih Sunor, San Francisco, CA (US); João Pedro Lacerda, Santa Cruz, CA (US); Akshay Aggarwal, San Jose, CA (US); Ryan E. Chapman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/486,032

(22) Filed: Oct. 12, 2023

(65) Prior Publication Data

US 2024/0403307 A1 Dec. 5, 2024

Related U.S. Application Data

(60) Provisional application No. 63/470,827, filed on Jun. 2, 2023.

(51) Int. Cl.
*G06F 16/2458* (2019.01)
(52) U.S. Cl.
CPC .................. *G06F 16/2477* (2019.01)
(58) Field of Classification Search
CPC .................................................. G06F 16/2477
See application file for complete search history.

(56) References Cited

U.S. PATENT DOCUMENTS

| | | | |
|---|---|---|---|
| 11,178,363 B1* | 11/2021 | Qian | G06V 20/52 |
| 11,625,444 B2† | 4/2023 | Minter | |
| 11,847,179 B2† | 12/2023 | Minter | |
| 2014/0106332 A1* | 4/2014 | Gessner | G09B 5/08 434/350 |
| 2017/0277769 A1* | 9/2017 | Pasupathy | H04L 41/22 |
| 2019/0391861 A1* | 12/2019 | Emerick | G06F 3/0483 |

\* cited by examiner
† cited by third party

*Primary Examiner* — Jay A Morrison
(74) *Attorney, Agent, or Firm* — BAKERHOSTETLER

(57) ABSTRACT

The subject technology provides for temporal reasoning. A system can receive contextual information from a plurality of data sources on an electronic device. The system can identify a predetermined pattern that is indicative of a particular activity in the contextual information within a time interval. The system can determine a confidence score for the particular activity based at least in part on one or more confidence values of a corresponding activity signal associated with the time interval. The system can update a graph-based data structure by adding a representation of the particular activity as a node to the graph-based data structure when a confidence score of the particular activity exceeds a confidence threshold. The system also can provide, for display on the electronic device, a user activity interface that provides access to an indexed collection of events organized by activity type by querying the graph-based data structure.

19 Claims, 8 Drawing Sheets

TEMPORAL REASONING

CROSS-REFERENCE TO RELATED APPLICATION(S)

This application claims the benefit of U.S. Provisional Application Ser. No. 63/470,827, entitled "TEMPORAL REASONING," and filed on Jun. 2, 2023, the disclosure of which is expressly incorporated by reference herein in its entirety.

TECHNICAL FIELD

The present description generally relates to electronic devices, and more particularly to temporal reasoning on electronic devices.

BACKGROUND

Various platforms and frameworks have been developed to facilitate the collection and management of contextual information. These platforms integrate data from diverse sources and provide application programming interfaces to allow access to context-aware applications.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
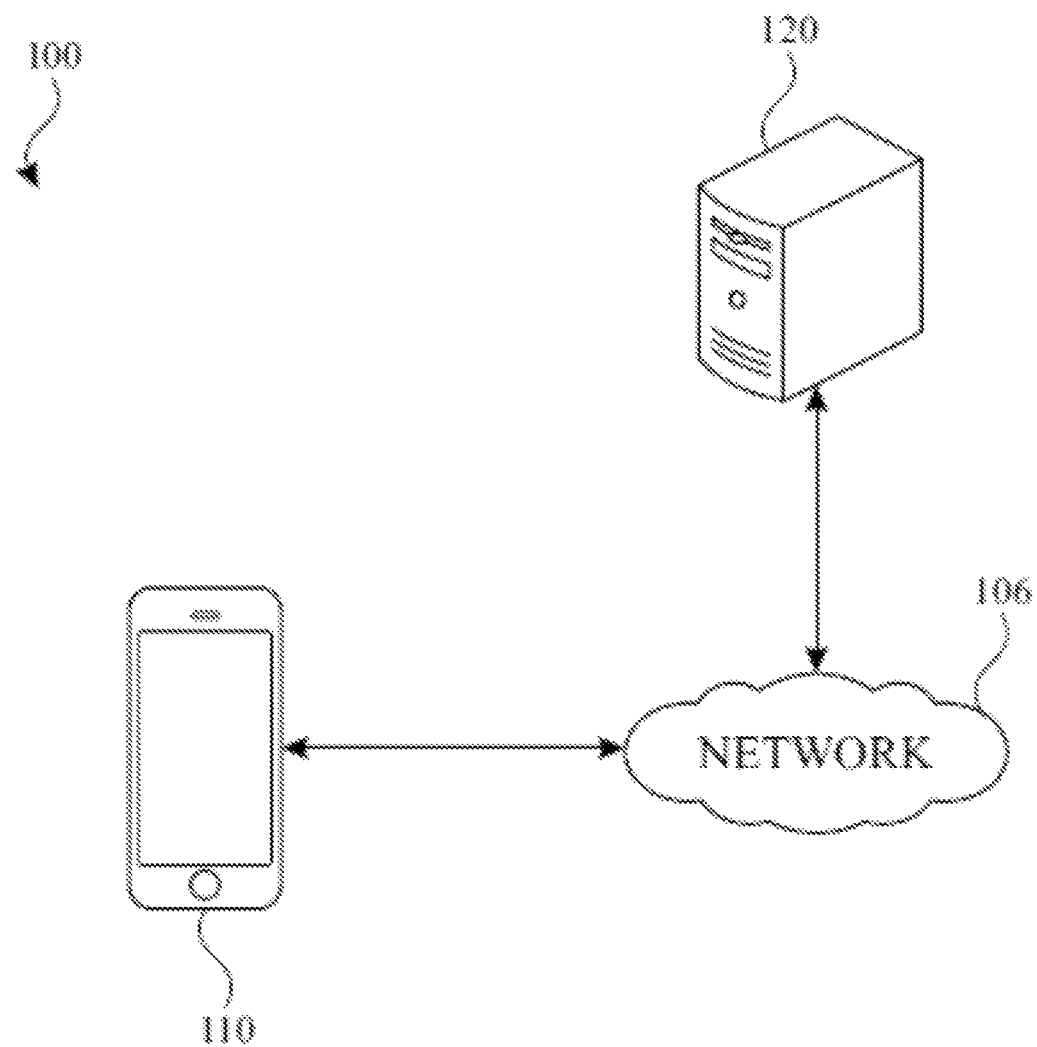
FIG. 1 illustrates an example network environment in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form to avoid obscuring the concepts of the subject technology.

The subject technology addresses challenges involving scattered contextual data existing across various applications and devices within a system. The present disclosure relates to a contextual understanding system and method that involves the generation of life events to construct a comprehensive mapping of routine events and extraordinary events in a user's life. This mapping encompasses past, present, and future aspects, incorporating dimensions of activity and social interactions. The subject technology encompasses the processing of collected contextual data over time and the application of various operations to extract valuable insights. These insights are manifested as life events, which provide a comprehensive description of different dimensions, including temporal aspects, activity in space, and social interactions. The resulting mapping offers a holistic representation of the user's life context, enabling personalized recommendations, predictive analysis, and targeted services based on the user's unique experiences and circumstances. Through the utilization of contextual understanding techniques, the subject technology facilitates the systematic organization and categorization of key events in a user's life, considering the spatial dimensions of activity as well as the social interactions associated with these events.

The events occurring on the electronic devices can be events triggered by user activity. These events can be analyzed using approaches discussed herewith to determine if any of these events represent a particular activity or are indicative of a particular activity. Once a particular activity is identified, it can be incorporated as a representation into a higher-order graph-based data structure. This graph-based data structure may represent a knowledge graph that encompasses the activity itself and any related data, such as images or locations. The graph-based data structure can store information in the form of nodes and edges, where the nodes represent entities, such as concepts, and the edges represent relationships between these entities. For example, the nodes may represent knowledge about life events, where the root node may be a life event and the child nodes may represent activities associated with that life event. All relevant information can be consolidated within the graph-based data structure, providing a comprehensive representation of the activity and its associated details. In the subject system, granular low-level events can be identified and acquired for mapping onto an ontology that encompasses knowledge about various entities, including people, places, and applications. By doing so, activity-centric events can be created that capture the specific activities, such as listening to music or dining out. These life events not only represent the activities themselves but also incorporate additional knowledge related to them. This knowledge includes information about the entities involved, contextual details, and other pertinent data associated with the activities.

The present disclosure also describes a process for detecting, constructing, and adding life event datasets to the graph-based data structure. For example, the subject technology encompasses a method for analyzing user activities by associating each activity with a specific sliding window representing a temporal range along a user's activity timeline. The sliding window allows for the examination of relevant data within the designated interval of each activity. For example, gaming may be associated with the interval x to y, while shopping may have a distinct interval from a to b. To facilitate the identification of specific patterns associated with each activity, a unique activity detector is assigned to each sliding window. In some aspects, one or more of the sliding windows have different lengths. The activity detectors can be configured to detect patterns indicative of the corresponding activity. Once a viable interval is detected within the user's activity timeline, the system can gather activity signals from various data sources and combines the gathered activity signals to calculate a confidence value for the activity, such as gaming, shopping, and the like.

The present disclosure also addresses the challenge of varying granularity levels associated with different types of contextual data. For example, contextual information can range from low-level details such as motion type data to higher-level events like application launches. By consolidating this diverse contextual information into life events, the subject technology enables a more efficient and comprehensive understanding of the user's life context, thereby enhancing the analysis and utilization of the data for various applications. The subject technology provides a unified framework that integrates and harmonizes contextual information of varying granularity levels. This framework can provide a comprehensive and cohesive representation of the user's life context, facilitating improved analysis and utilization of the data. By condensing contextual information into life events, the subject technology can overcome the limitations of processing data at different levels of granularity separately. This unified approach allows for a more streamlined understanding of the user's life context, enabling the development of advanced algorithms, models, and systems that can provide valuable insights and recommendations.

In the present disclosure, the focus is not solely on the graph-based data structure itself, but rather on the parsing of events on the electronic device and the identification of specific patterns indicative of particular activities. The subject technology can utilize various detectors and inference models to determine the occurrence of potential events. Once a certain confidence level is achieved, the identified event is incorporated into the graph-based data structure, thereby becoming a valuable component of the overall knowledge representation. The subject technology can achieve coverage and accuracy in the event detection, allowing for the enrichment of the graph-based data structure with meaningful life events. By detecting, constructing, and adding life event datasets as nodes to the graph-based data structure, the subject technology enables a comprehensive understanding of a user's activities and context. This enhanced knowledge representation facilitates the development of advanced algorithms, models, and systems that can provide valuable insights and recommendations to a user. The incorporation of life event datasets into the graph-based data structure further enables the creation of personalized applications and services in various fields, including but not limited to, behavior analysis, health management, and targeted advertising. The detection of life events ensures the availability of high-quality data for these applications, contributing to an improved user experience and enhanced system performance.

FIG. 1 illustrates an example network environment 100 in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 110, and a server 120. The network 106 may communicatively (directly or indirectly) couple the electronic device 110 and/or the server 120. In one or more implementations, the network 106 may be an interconnected network of devices that may include, or may be communicatively coupled to, the Internet. For explanatory purposes, the network environment 100 is illustrated in FIG. 1 as including the electronic device 110, and the server 120; however, the network environment 100 may include any number of electronic devices and any number of servers.

The electronic device 110 may be, for example, a desktop computer, a portable computing device such as a laptop computer, a smartphone, a peripheral device (e.g., a digital camera, headphones), a tablet device, a wearable device such as a watch, a band, and the like. In FIG. 1, by way of example, the electronic device 110 is depicted as a mobile electronic device (e.g., smartphone). The electronic device 110 may be, and/or may include all or part of, the electronic system discussed below with respect to FIG. 8.

In one or more implementations, the electronic device 110 may provide a system for training a machine learning model using training data, where the trained machine learning model is subsequently deployed to the electronic device 110. Further, the electronic device 110 may provide one or more machine learning frameworks for training machine learning models and/or developing applications using such machine learning models. In an example, such machine learning frameworks can provide various machine learning algorithms and models for different problem domains in machine learning. In an example, the electronic device 110 may include a deployed machine learning model that provides an output of data corresponding to a prediction or some other type of machine learning output. In one or more implementations, training and inference operations that involve individually identifiable information of a user of the electronic device 110 may be performed entirely on the electronic device 110, to prevent exposure of individually identifiable data to devices and/or systems that are not authorized by the user.

The server 120 may provide a system for training a machine learning model using training data, where the trained machine learning model is subsequently deployed to the server 120 and/or to the electronic device 110. In an implementation, the server 120 may train a given machine learning model for deployment to a client electronic device (e.g., the electronic device 110). In one or more implementations, the server 120 may train portions of the machine learning model that are trained using (e.g., anonymized) training data from a population of users, and the electronic device 110 may train portions of the machine learning model that are trained using individual training data from the user of the electronic device 110. The machine learning model deployed on the server 120 and/or the electronic device 110 can then perform one or more machine learning algorithms. In an implementation, the server 120 provides a cloud service that utilizes the trained machine learning model and/or continually learns over time.

In the example of FIG. 1, the electronic device 110 is depicted as a smartphone. However, it is appreciated that the electronic device 110 may be implemented as another type of device, such as a wearable device (e.g., a smart watch or other wearable device). The electronic device 110 may be a device of a user (e.g., the electronic device 110 may be associated with and/or logged into a user account for the user at a server). Although a single electronic device 110 is shown in FIG. 1, it is appreciated that the network environment 100 may include more than one electronic device, including more than one electronic device of a user and/or one or more other electronic devices of one or more other users.

In one or more implementations, a temporal reasoning platform (or framework) may be implemented over the network environment 100, and the temporal reasoning platform may include two or more primary components, such as a client component and a server component. The client component may serve as the user-facing application that runs on a user device (e.g., the electronic device 110), while the server component serves as the backend infrastructure that stores and processes data on the server 120 in a secure (e.g., encrypted) and privacy-preserving manner. In one or more implementations, both the client component and the server component may be executed on the electronic device 110.

When a user interacts with the temporal reasoning application, the user is interacting with the client component. The application running on the electronic device 110 can provide a user interface for the user to create, edit, and view life event entries. The temporal reasoning application also may interact with the server 120 to store and retrieve data. In one or more implementations, when a user creates a new life event entry, the temporal reasoning application may store the life event entry in an encrypted container at the server 120, such that the life event entry is only accessible (i.e., decryptable) by the electronic device 110. Similarly, when a user wants to view their past life event entries, the temporal reasoning application can send a request to the server 120 to retrieve the encrypted life event entries.

The client component of the temporal reasoning application may be responsible for storing and processing data in some implementations. When a user creates a new life event entry, the electronic device 110 can store the life event entry in an encrypted container that is only accessible by the electronic device 110. In some implementations, the electronic device 110 can perform processing on the data to generate a detailed representation encompassing spatial, activity, social, and health dimensions of various activity information associated with a user for presenting a contextual understanding of the user's activities and context to the user. For example, the electronic device 110 may analyze data indicating the user's previous activities to identify temporal life event information on the electronic device 110. Based on this analysis, the electronic device 110 can generate a comprehensive understanding of the user's life context, enhancing the analysis and utilization of the data for various applications.

In one or more implementations, the electronic device 110 can use machine learning algorithms to implement a temporal reasoning feature. The machine learning algorithms can analyze data indicating the user's previous entries and identify patterns in the data. The machine learning algorithms can then use these identified patterns to generate a detailed representation encompassing a contextual understanding of new inferred life events. The electronic device 110 can also use natural language processing (NLP) techniques to analyze data indicating various concepts and establish meaningful connections between such concepts. In one or more implementations, one or more of the operations performed by the electronic device 110 may be performed by the server 120, such as in a secure and privacy-preserving manner.

Figure 2:
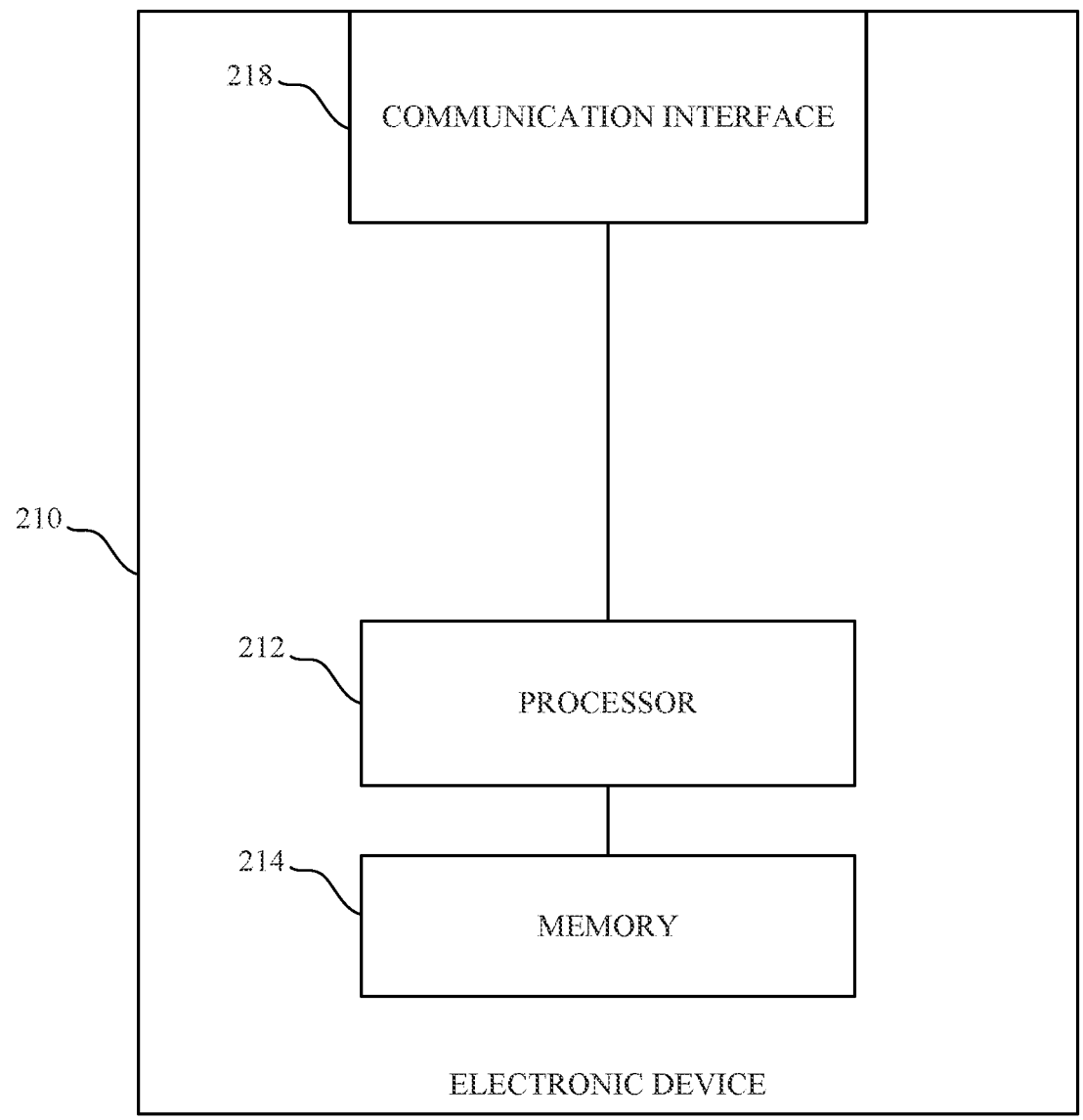
FIG. 2 illustrates an example electronic device that may implement a system for temporal reasoning in accordance with one or more implementations.

FIG. 2 illustrates an example electronic device 102 that may implement a system for providing dynamic presentation of content suggestions for annotation in a temporal reasoning platform in accordance with one or more implementations. For example, the electronic device 210 of FIG. 2 can correspond to the electronic device 110, and/or to the server 120 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 210 may include a processor 212, a memory 214, and communication interface 218. The processor 212 may include suitable logic, circuitry, and/or code that enable processing data and/or controlling operations of the electronic device 210. In this regard, the processor 212 may be enabled to provide control signals to various other components of the electronic device 210. The processor 212 may also control transfers of data between various portions of the electronic device 210. Additionally, the processor 212 may enable implementation of an operating system or otherwise execute code to manage operations of the electronic device 210.

The memory 214 may include suitable logic, circuitry, and/or code that enable storage of various types of information such as received data, generated data, code, and/or configuration information. The memory 214 may include, for example, random access memory (RAM), read-only memory (ROM), flash, and/or magnetic storage. The electronic device 210 may further include a sensor (not shown), such as an image sensor, a positioning sensor (e.g., accelerometer, GPS, etc.), a proximity sensor (e.g., Bluetooth, WiFi Aware, etc.), and the like.

The communication interface 218 may include suitable logic, circuitry, and/or code that enables wired or wireless communication, such as the electronic device 110 and/or the server 120 over the network 106. The communication interface 218 may include, for example, one or more of a Bluetooth communication interface, a cellular communication interface (e.g., 3G, 4G, LTE, 5G, etc.), an NFC interface, a Zigbee communication interface, a WLAN communication interface (e.g., Wi-Fi, WLAN/BT combination, WiMAX, LiFi, 2.4 GHz, 5 GHZ, etc.), a USB communication interface, an Ethernet communication interface, a millimeter wave (e.g., 60 GHz) communication interface, or generally any communication interface.

In one or more implementations, one or more of the processor 212, the memory 214, the communication interface 218, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

The subject technology may be implemented in software, firmware, or hardware and may be embodied in a variety of different devices, including but not limited to smartphones, tablets, wearables, and other mobile computing devices. The subject technology may also be implemented as a cloud-based service, allowing users to access and analyze their data from any device with an Internet connection.

Figure 3:
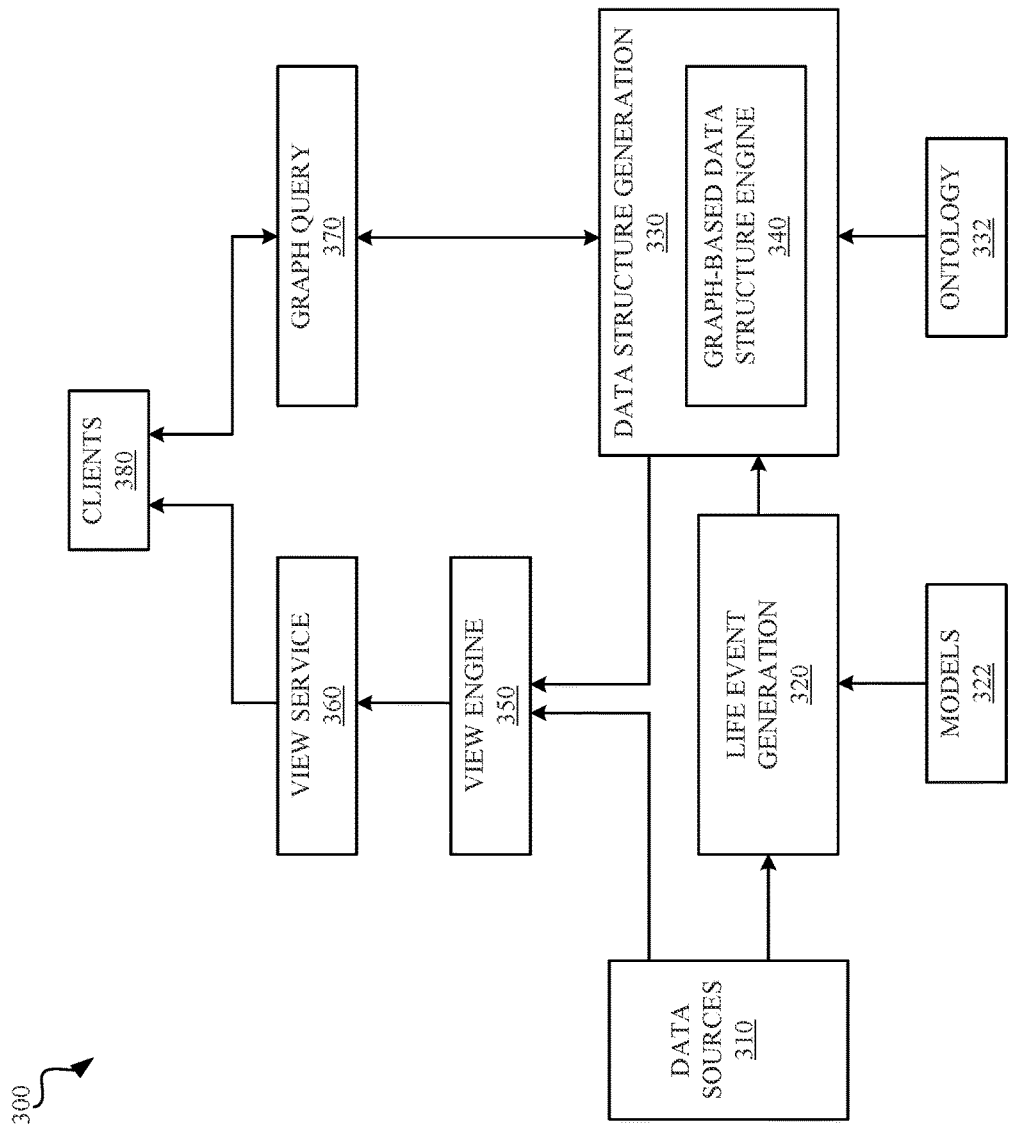
FIG. 3 illustrates an example computing architecture of a system for temporal reasoning in accordance with one or more implementations.

FIG. 3 illustrates an example computing architecture of a system 300 for temporal reasoning in accordance with one or more implementations. The system 300 includes data sources 310, a life event generation module 320, a data structure generation module 330, a graph-based data structure engine 340, a view engine 350, a view service 360, and a graph query service 370.

The system 300 incorporates various data sources (e.g., data sources 310) to facilitate the generation of life events. The data sources 310 may encompass diverse types of information, including motion states, application launches, calendar events, and others. The core concept of the system 300 may revolve around capturing motion states, which can span from stationary to running or any other relevant state of a user. By examining the activities and events that occur during these motion states, the system 300 may aggregate information from multiple sources, such as the data sources 310, which may be associated with the same event or activity.

In some implementations, motion state alone is not the sole determinant, as additional factors also play a role. For example, when activity is categorized as "running," the motion state should align with the relevant location, such as a hiking trail or running track. By combining all available information, the system 300 can initially identify meaningful segments of a user's life and subsequently analyze the corresponding signals to classify them into taxonomic life events. These events cover a broad range of activities, including running, biking, hiking, dining out, shopping, or the like, and the aim is to expand this taxonomy to encompass an extensive collection of events, potentially reaching up to an arbitrary number of distinct categories.

In some implementations, access to the data sources 310 is facilitated through private SPIs (Service Provider Interfaces) that enable direct communication with the respective data providers. These SPIs can provide a secure and efficient means of accessing the data required for life event generation. In addition to the SPIs, the system 300 may utilize standardization streams, which serve as a central repository for sensor data. For example, each of the standardization streams may be a time series data store that helps to standardize and unify the format of all the different sensor streams. By centralizing the sensor data in a standardized format, the system 300 can process and analyze the data from the data sources 310 for the generation of life events.

The life event generation module 320 within the computing architecture of the system 300 may be responsible for deriving meaningful insights from the collected data. The life event generation module 320 may utilize various models 322, such as an activity inference model to process multimodal data from the data sources 310 and extract valuable inferences. By combining these pieces of information, the life event generation module 320 can construct comprehensive life events that capture users' activities, locations, and social interactions. The life event generation module 320 may be a vital component of the system 300, as it enables the transformation of raw data into meaningful representations of users' lives. Through the utilization of multiple models (e.g., 322) and the integration of various data sources (e.g., 310), the life event generation module 320 can enhance the understanding of users' activities, locations, and interactions. These comprehensive life events provide valuable insights that can be utilized for personalized recommendations, targeted services, and other applications that benefit from a deep understanding of users' life context. In some implementations, the life event generation module 320 creates a dataset containing a collection of data that represents a corresponding life event. For example, this collection of data can store information about an event or activity in the user's life. The dataset corresponding to a life event is discussed in more detail in FIG. 4 below. In some implementations, these datasets can be stored as part of the graph-based data structure by storing metadata indicating one or more connections with other datasets representing a corresponding event or activity also stored as part of the graph-based data structure.

The representation and integration of life events may be achieved through knowledge construction techniques. In some implementations, the data structure generation module 330, via the graph-based data structure engine 340, may map the derived life events onto a graph-based data structure, which serves as a robust information repository within the system 300. In some implementations, the graph-based data structure may represent a knowledge graph that can store information in the form of nodes and edges, where the nodes represent entities, such as concepts, and the edges represent relationships or connections between these entities. For example, the nodes may represent knowledge about life events, where the root node may be a life event representing an activity and the child nodes may represent entities (e.g., person, location, time, social contacts, etc.) associated with that life event.

To enrich the graph-based data structure, an ontology 332 is provided to the data structure generation module 330 and expanded to incorporate the diverse range of activities supported by the system 300. In some aspects, the ontology 332 may represent people, places, and other relevant entities, ensuring a standardized and interconnected knowledge representation.

The knowledge construction techniques employed in the system 300 can facilitate organizing and integrating the life events. By mapping the derived events onto the graph-based data structure, a comprehensive understanding of users' activities and context can be realized. The expansion of the ontology 332 within the graph-based data structure enables the system 300 to represent and categorize the diverse activities supported by the system 300. Furthermore, the utilization of the ontology 332 for representing people, places, and other entities can ensure consistency and interoperability within the knowledge representation.

The incorporation of life events into the graph-based data structure may be followed by the provision of various services and APIs that facilitate information access. In some implementations, the view engine 350 may provide for display, via the view service 360, of a customizable view to clients 380, such as a journaling application, a photos application, or generally any application that may utilize life events. This view provides a focused perspective on the activities, locations, and social connections associated with each life event. The clients 380 can utilize this the view service 360 to retrieve specific details, including the person's actions, their whereabouts, and the individuals they interacted with during a particular life event.

By incorporating the life events into the graph-based data structure and offering a customizable view through the view engine 350, the system 300 can enhance the accessibility and usability of the information. The clients 380, such as a journaling application, can retrieve detailed information about specific life events, including the associated activities, locations, and social interactions. This can empower users to gain insights into their past experiences and interactions, facilitating self-reflection and providing a valuable resource for personal documentation.

In some implementations, the view engine 350 and/or the view service 360 provide a unified view to provide comprehensive information on various activities, accessible to one or more of multiple system users. The view service 360 allows users to query specific activities, such as dining out or gaming, and retrieve corresponding life events, along with associated locations and individuals involved, within a specified time range. The view service 360 can serve as an indexed collection of events organized by activity type, enabling efficient retrieval of relevant information. To ensure the view service 360 remains up-to-date, the system 300 can incorporate regular updates and/or scheduled processing. The models 322 can be executed on a schedule or periodic basis, enabling real-time processing throughout a predetermined time period. This combination of periodic and scheduled running ensures the continuous availability of the activity view via the view service 360, providing users with the most recent and accurate information.

In some implementations, the graph query service 370 may enable users to issue queries over the graph-based data structure. The graph query service 370 allows users to formulate custom queries to obtain tailored information from the graph-based data structure. For example, users can inquire about the individuals they have interacted with during their time at work by querying for life events that occurred at the workplace and filtering for the involved individuals. By formulating custom queries, users can obtain tailored insights based on their unique requirements. The graph query service 370 can enhance the flexibility and usability of the system 300 by empowering users to extract specific information from the graph-based data structure.

Figure 4:
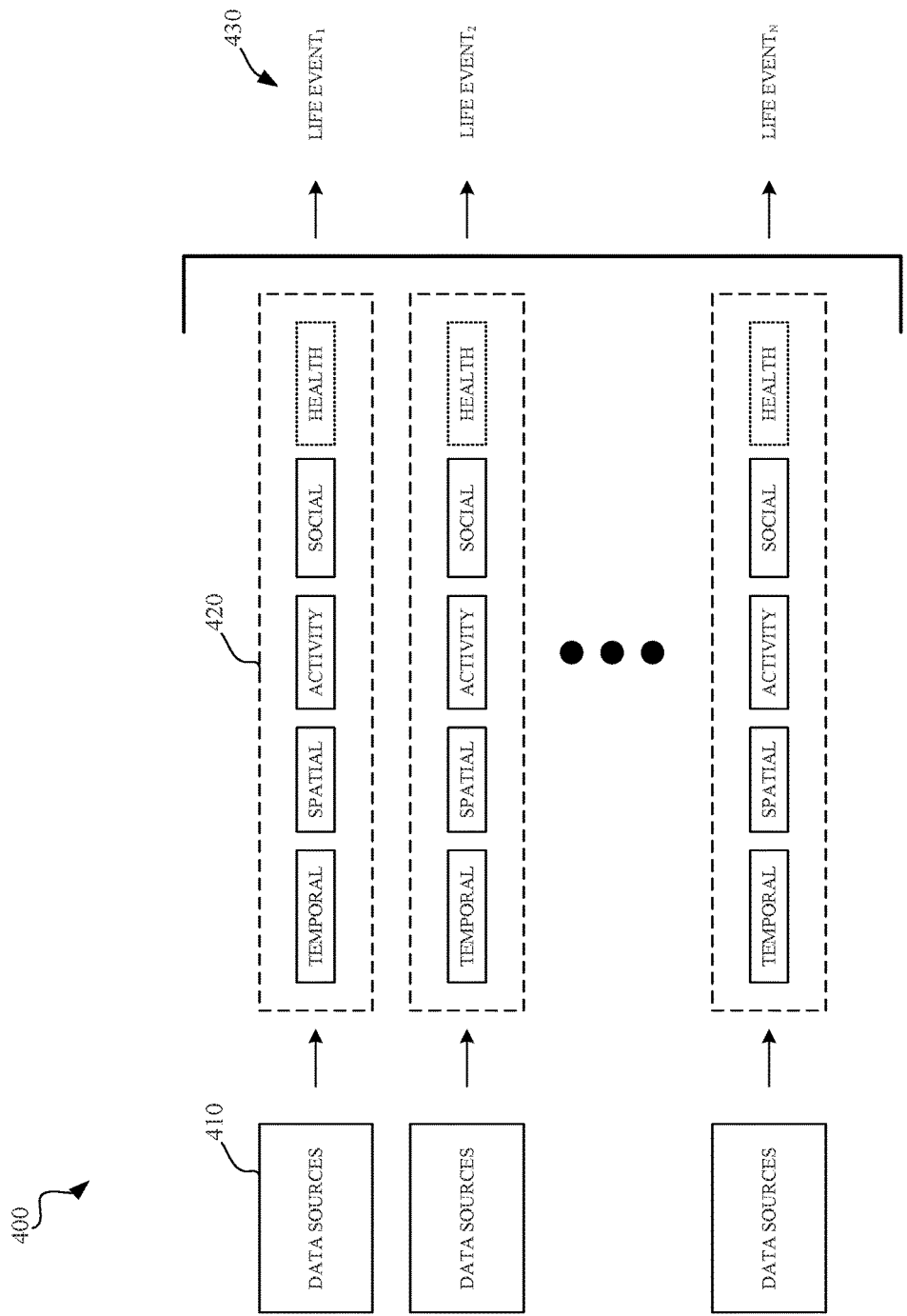
FIG. 4 conceptually illustrates a diagram of an example of life event generation in accordance with one or more implementations.

FIG. 4 conceptually illustrates a diagram 400 of an example of life event generation in accordance with one or more implementations. For example, the diagram 400 illustrates a practical example of generating life event datasets 430. In a user's typical day, the subject system creates a detailed representation of a life event (e.g., Life Event$_1$, Life Event$_2$ ... Life Event$_N$) that includes multiple dimensions 420, such as temporal, spatial, activity, social, and potentially health dimensions. The life event dataset 430 can capture activity information from data sources 410 that include activity signals indicating the user's location, performed activities, and interactions with others. In some implementations, the subject system may incorporate a health dimension to include relevant health-related information of a user. The life event dataset 430 can store a collection of user activity information on the subject system that describes all pertinent details of a user's actions and the associated user life context. The life event dataset 430 can provide an understanding of the user's activities and context, facilitating enhanced analysis and utilization of the data across various applications.

In the subject system, activity signal inferences can be generated through the contribution of the data sources 410. For instance, motion state data can be leveraged, providing insights into the user's physical movements. Additionally, focus modes can be incorporated, capturing high-level states such as working, sleeping, and reading. Activity signal inferences are further enhanced by predictions from focus modes. Utilization of application usage data and events within applications is also implemented, including hotel and restaurant reservations, payment transactions, and merchant metadata. The identification of specific points of interest, such as restaurants, can be enabled through location visits. Furthermore, the core signals driving the current inferences can be contributed by virtual interactions on the electronic device 110, including gaming interactions in gaming experiences.

The challenge with context-aware applications may relate to the abundance of diverse low-level sensory data associated with events that are spread across different applications and devices. The subject technology provides for unifying and amalgamating these disparate data streams, resulting in coherent life events to be inferred. The on-device environment of the electronic device 110 may include multiple sensor streams from the data sources 410, raising the question of how to transform these individual streams into meaningful events that confidently describe specific activities, such as "dining out." In a use case where numerous streams of contextual data are available, it needs to be determined when a significant change in context occurs, indicating that a user is engaged in a particular activity.

The subject technology addresses this challenge by identifying key contextual transitions and the discernment of their relevance in capturing meaningful activities. For example, the subject technology may utilize location changes as a primary indicator for the identification of meaningful activities. Furthermore, application launches may be considered as an auxiliary factor in this determination process. For example, prolonged usage of a gaming application can indicate engagement in gaming activities. Therefore, the approach encompasses a multimodal combination of location changes, motion patterns, and application usage to identify meaningful segments.

The problem at hand, as described, pertains to the determination of viable or meaningful intervals for each activity. For instance, in the case of a flight, the identification process involves the search for two distinct locations associated with airports and the requirement that the user's ground speed exceeds a specific threshold, such as 100 miles per hour, indicating actual travel between those locations. This criterion establishes a viable flying interval. A complex logic is employed to identify such meaningful segments, enabling the search for relevant information related to the activity. For a potential flying activity, the retrieval of boarding passes, flights identified in the user's email, and other related data sources 410 may be involved. These data sources 410 may be utilized to determine the occurrence of flight-related activities. Similarly, in the case of shopping, consideration is given to the time spent in a general location where more movement than stationary behavior is observed. By applying these criteria and determinations, accurate identification and analysis of various activities can be achieved.

In some implementations, the temporal aspect of each activity may be defined by a start and end time. The determination of meaningfulness varies for each activity, such as dining out, mindfulness, or listening to music, as they have their own predefined intervals that are considered significant. For instance, a meaningful time segment for dining out may involve a location visit accompanied by stationary motion. In other cases, application usage becomes a significant indicator. While being at home may not reveal anything meaningful through location or motion alone, activities like gaming or engaging in mindfulness exercises can be identified by analyzing application usage. The approach recognizes that different signals can signify meaningful events within specific time frames. Location, motion, and application usage primarily serve as the basis for determining these potential time intervals. In cases such as flights, factors like location, distance, and time are considered alongside speed. These four elements form the main components used to identify noteworthy time segments that are then mapped to corresponding activities. For simpler activities like listening to music or application usage, their occurrence on the device may be evident. Therefore, the process may involve working backward from activities, where each activity has its defined meaningful time interval. Within these intervals, activity signals are examined to determine the nature of the activity.

Figure 5:
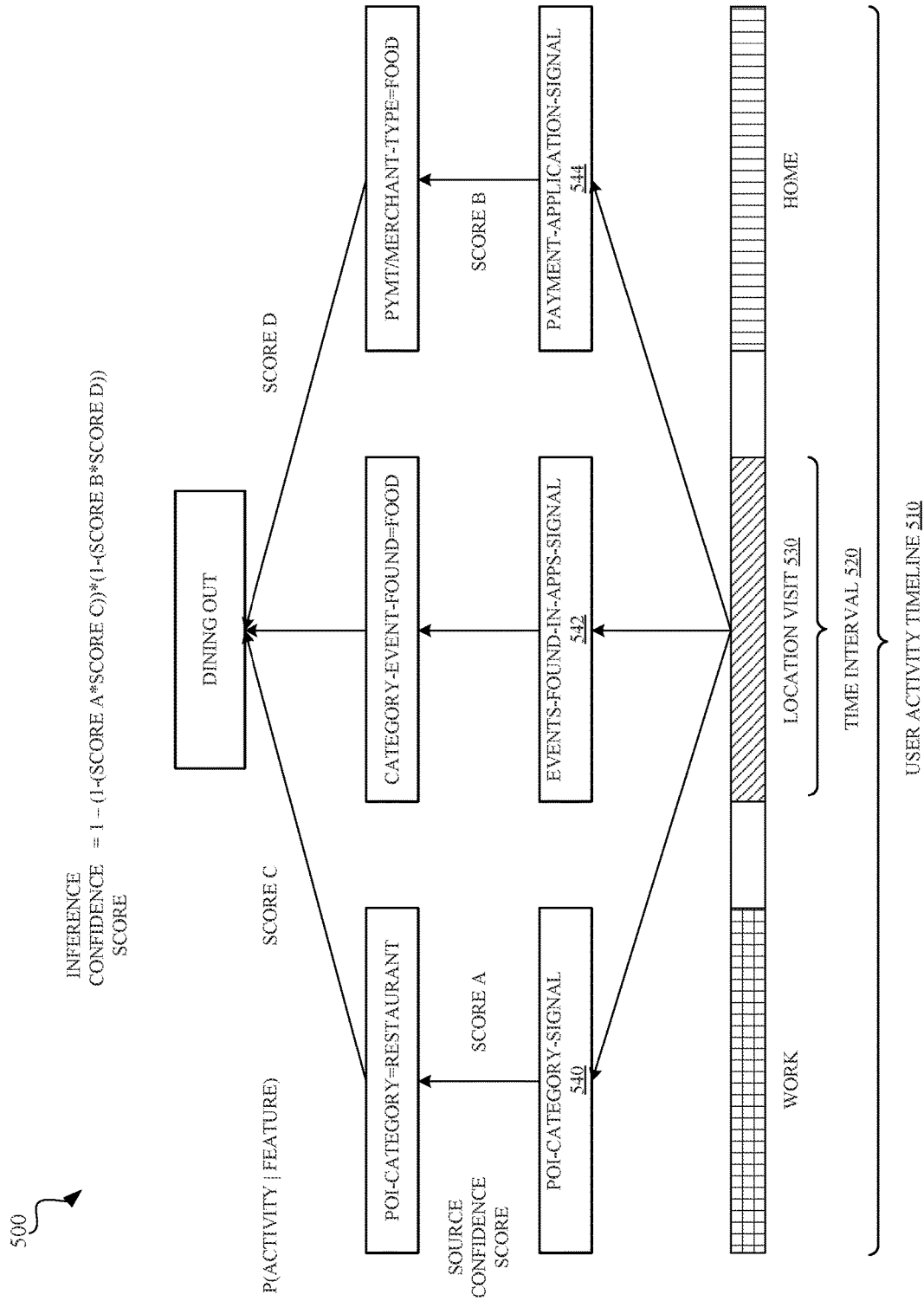
FIG. 5 conceptually illustrates an example diagram of an activity inference model in accordance with one or more implementations.

FIG. 5 conceptually illustrates an example diagram 500 of an activity inference model in accordance with one or more implementations. The diagram 500 illustrates one or more potential user activities along a user activity timeline 510. In some aspects, the activity inference model as illustrated in FIG. 5 may be a dining out model; however, other activity inference models may be utilized in other aspects of the subject technology to discern activity signals along a user activity timeline 510. In some implementations, the process of detecting motion state may involve a two-step approach aimed at generating accurate activity inferences. The initial step may entail identifying a time interval 520 for each activity along the user activity timeline 510, which may be accomplished by utilizing various factors such as speed, motion, location, and application usage. These factors contribute to determining potential time intervals (e.g., 520), and different algorithms may be employed based on the nature of the activity. For example, in the case of a flight, the algorithm takes into account factors such as speed and distance between locations, whereas for shopping, it focuses on location visits accompanied by significant movement. Once the time interval 520 is identified, the subsequent step involves assessing the activity signals present within that timeframe and determining how to effectively combine them to derive the desired inference.

After identifying the time interval 520 as a meaningful segment within the user activity timeline 510, the available activity signals within the time interval 520 may be analyzed to determine the likelihood of a specific activity occurring during that timeframe. This comprehensive analysis incorporates multiple sources of activity signals, allowing for a more accurate determination of user activities.

Upon the identification of a location visit 530, the specific activity undertaken at that place is to be discerned. In some implementations, various activity signals on the electronic device 110 can be analyzed within the context of the dining out model. Three key activity signals may be analyzed: a point of interest (POI) category of the visited place (e.g., restaurant) using a POI category signal 540, events associated with a restaurant found in applications (e.g., restaurant bookings) using an events found in applications signal 542, and food payments made within the corresponding time period using a payment application signal 544.

Small Bayesian networks may be employed in the subject system to model the probability of dining out based on various activity signals, and Naive Bayes may be utilized to estimate the final probability. The determination of the parameters for these models is facilitated through utilization of a population-based activity data. The approach may combine grounded models with data-driven tuning derived from the population-based activity data. In some implementations, the small Naive Bayes network may take into account the confidence levels of each information source.

As the accuracy of the location visit itself may not be absolute, the confidence associated with that particular data source may be considered during computation. For example, if the location confidence is about 80%, and the likelihood of dining out at a restaurant during this timeframe is assigned a probability of around 90%, the subject system can generate an inference confidence score indicating there is about a 90% probability of dining out upon observing the location visit 530 at a restaurant. In some aspects, a small margin (about 10%) may account for use cases where the individual may not have actually dined out; however, the overall inference confidence score remains significantly high.

In some implementations, the payment application signal 544 may indicate the availability of payment receipts. The payment application signal 544 may not exhibit any source noise and may provide direct observation into the payment transaction at the location visit 530. When a payment transaction occurs, the subject system may determine whether the individual was indeed dining out or simply picking up food. Although this determination may not be absolute, the confidence in dining out increases significantly when both the location visit 530 and the presence of a payment receipt via the payment application signal 544 are observed within the time interval 520. While the individual activity signals may independently yield a confidence score value of approximately 90%, combining both activity signals using a Bayesian network can result in a confidence level of about 97% in one or more implementations.

In some implementations, multiple activity inference models can be run concurrently to determine the activity taking place within an identified time interval. While the activity inference model may result in higher confidence scores, there may be other inference models that exhibit lower confidence scores as they attempt to identify the specific activity occurring within a meaningful time interval. For example, when encountering the location visit 530, the activity inference model may determine if the user is attending an event, shopping, or dining out. Therefore, multiple activity inference models can be employed to ascertain the actual activity taking place within the same time interval. The confidence scores generated by these activity inference models can be weighted and averaged, or compared against similar confidence scores, enabling the selection of the activity with the highest confidence score from one of the activity inference models as the primary identification. In some implementations, all relevant knowledge from the activity inference models can be incorporated into the graph-based data structure. Subsequently, the thresholding and selection of the activity with the highest confidence score within a time interval (e.g., 520) can be performed based on the specific user configurations.

The subject technology addresses the challenge of establishing meaningful connections between various concepts, such as that possess inherent semantic meaning and associated knowledge within an on-device graph-based data structure. Unlike conventional approaches that treat these concepts as isolated strings without contextual understanding, the subject system utilizes the graph-based data structure to create a network of connections and relationships. By integrating and linking these concepts within the graph-based data structure, the subject technology enhances the overall contextual understanding and enables more sophisticated analysis and utilization of the contextual data. This approach ensures that the intricate interplay between different entities, activities, and their corresponding knowledge is effectively captured, facilitating a more comprehensive and meaningful representation of the user's life context.

Figure 6:
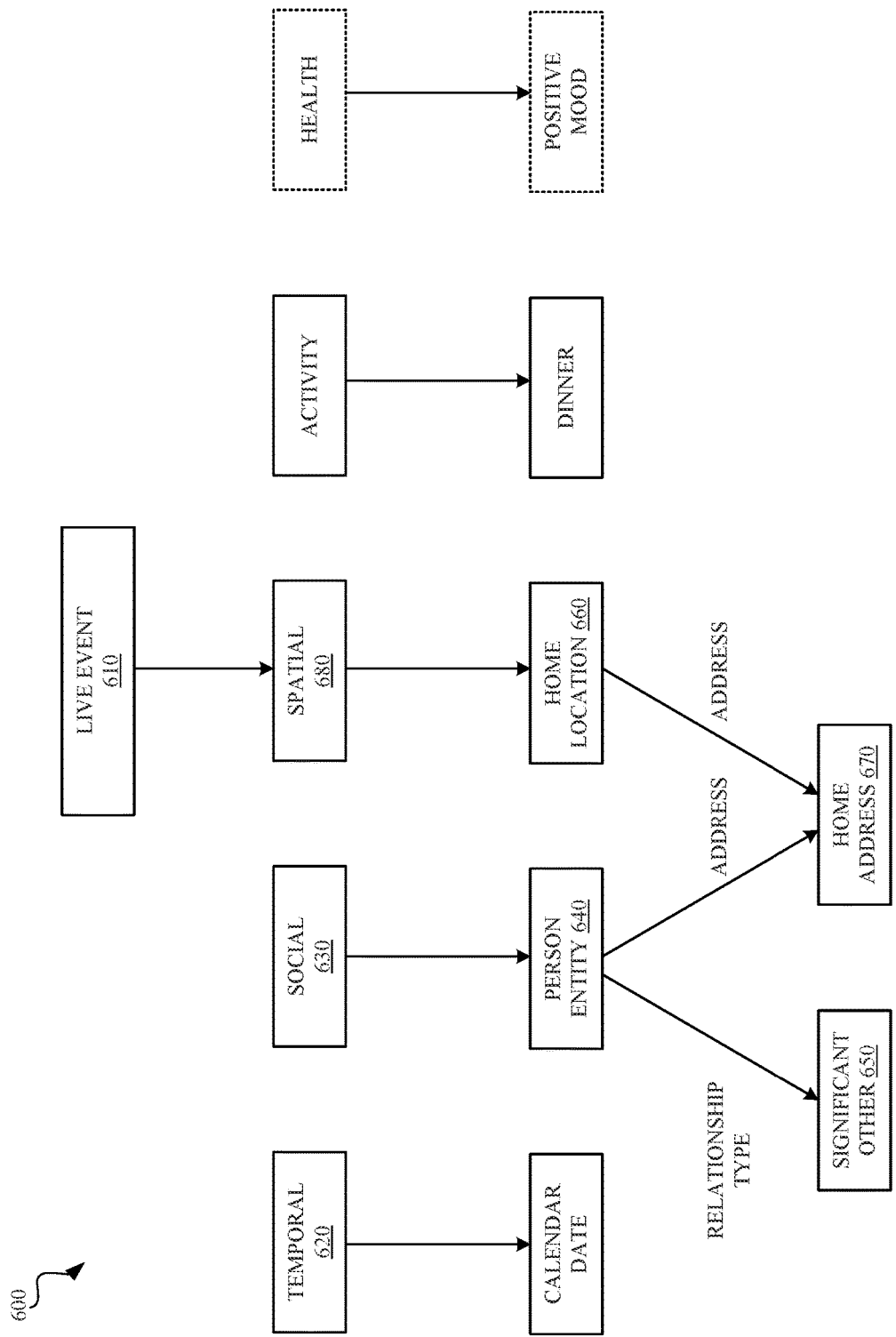
FIG. 6 conceptually illustrates a diagram of an example graph-based data structure for temporal reasoning in accordance with one or more implementations.

FIG. 6 conceptually illustrates a diagram 600 of an example graph-based data structure for temporal reasoning in accordance with one or more implementations. As illustrated in FIG. 6, a life event 610 is encompassed by a temporal dimension 620, and a user's association with the event is established through a social dimension 630. Within the graph-based data structure, a user is represented as a person entity 640, and that user's relationship type is indicated as a significant other 650. Furthermore, by leveraging contact information, the graph-based data structure may indicate the home location 660 of the user as home address 670. Through the capabilities of the graph-based data structure, a spatial dimension 680 may be connected to the same home address 670 associated with the person entity 640 in the given context. This integration of the spatial dimension 680 and the temporal dimension 620 enables second-order reasoning over a user's life context. The temporal reasoning capability via the graph-based data structure facilitates exploration and analysis of contextual relationships, providing a robust framework for comprehensive reasoning and deeper understanding of the user's life context.

In some implementations, life events can be integrated as datasets with the graph-based data structure stored on the electronic device 110, incorporating various entities and their properties. This integration enables the creation of a graph-based data structure representing temporal reasoning that includes information about locations and individuals. FIG. 6 illustrates the integration of the life event datasets with the graph-based data structure. The graph-based data structure may show the interconnection between nodes representing the relationships between the different activities, such as commuting from home to work, and specific dining out events, such as visits to a particular restaurant.

In some implementations, each life event dataset may be associated with a confidence score value, representing the likelihood of the occurrence of the activity based on the available activity information. In other words, this score may serve as a measure of the likelihood that the identified life event accurately represents the intended activity or event. It provides valuable insight into the certainty of the individual's engagement in a specific activity or event. The confidence score is a factor in determining the reliability and accuracy of the associated life event.

The graph-based data structure can depict the interconnection between a variety of activities, such as exercising, social interactions, gaming, and similar activities. Additionally, the life event dataset in the graph-based data structure can include additional metadata, for example a bundle identifier for gaming activities. The activities depicted in the life event datasets may also encompass phone calls, reading, running, and shopping. For example, a life event dataset in the graph-based data structure may depict a shopping event at a specific market, accompanied by its corresponding confidence score value. The graphical representation of the graph-based data structure can provide an engaging visual experience. Moreover, the graphical representation of the graph-based data structure can display the location where the activity occurred, highlighting the shopping event alongside other co-occurring life events. For instance, stationary and walking events can be observed during the shopping activity.

In some implementations, the graph-based data structure may include depiction of stationary events and transportation activities. For example, one of the life event datasets in the graph-based data structure may represent a transportation activity, involving a flight from Hawaii to San Francisco. When visually representing this information, the activities associated with San Francisco Airport can be observed. Additionally, the graph-based data structure may include indications of other flights between various locations. For example, a life event dataset representing a flight activity connecting San Francisco and Hawaii may be displayed, with the metadata in the life event dataset indicating the mode of transportation being an airplane.

In some implementations, the graph-based data structure may be utilized to predict future life events. For example, the utilization of historical commute data derived from inferred life events can be employed to predict future life events within the subject system. Based on this information, the likelihood of an individual commuting in the next hour, 30 minutes, and other time intervals can be continuously ranked in real-time. In some aspects, the graph-based data structure may provide a predictive capability, where an upcoming commute is identified, and directions are suggested accordingly. Furthermore, the graph-based data structure may be integrated with other applications, for example a shortcut application that allows users to automate various system actions through contextual triggers. For example, users can set up an automation to send a text message to a friend when a predicted commute back home is imminent. This contextual trigger may be associated with the predictive capability of the graph-based data structure.

The focus of the subject technology lies in the capturing of temporal life events on the electronic device 110, allowing for a comprehensive understanding of user activities. Mindfulness activities, for example, are recognized and associated with the location "home" through application launches. Notably, the home location may act as a central point that connects various events. When capturing texting events, the subject system can capture the location as home and may also include information about the message recipients. This integration of rich temporal knowledge with information about entities, individuals, and artists enables a cohesive understanding of user experiences and activities.

In summary, the graph-based data structure for temporal reasoning can consolidate and unify scattered temporal information across the subject system, resulting in a condensed and entity-centric representation. This representation may constitute an episodic memory, capturing connections among individuals, locations, activities, and semantically significant temporal segments within graph-based data structure. As a result, this comprehensive mapping encompasses both ordinary and extraordinary events spanning the past, present, and future, encompassing the spatial, activity, and social domains.

Figure 7:
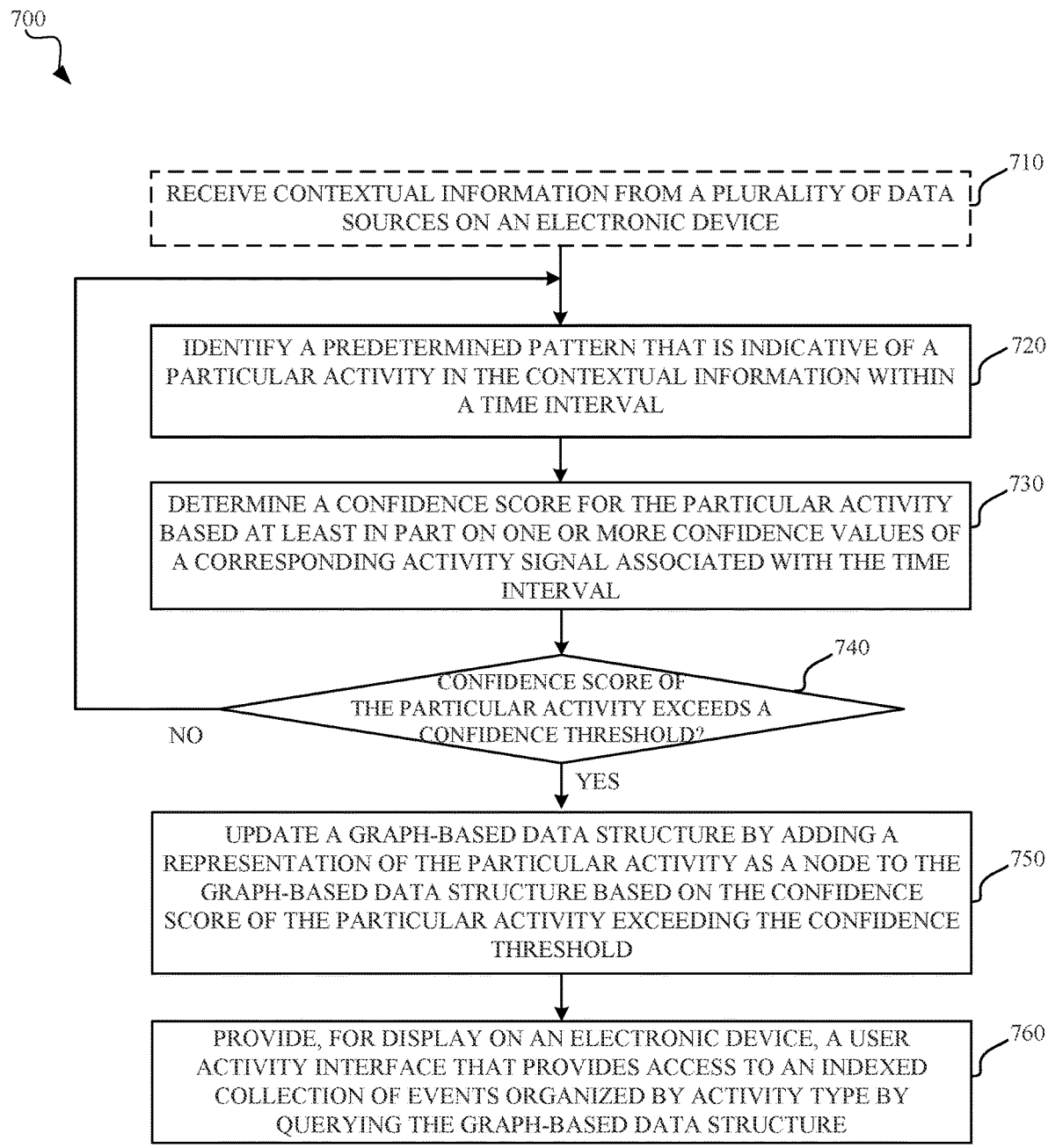
FIG. 7 illustrates a flow chart of an example process for performing temporal reasoning in accordance with one or more implementations.

FIG. 7 illustrates a flow chart of an example process 700 for performing temporal reasoning in accordance with one or more implementations. For explanatory purposes, the process 700 is primarily described herein with reference to the electronic device 110 of FIG. 1. However, the process 700 is not limited to the electronic device 110 of FIG. 1, and one or more blocks (or operations) of the process 700 may be performed by one or more other components of other suitable devices and/or servers. Further for explanatory purposes, some of the blocks of the process 700 are described herein as occurring in serial, or linearly. However, multiple blocks of the process 700 may occur in parallel. In addition, the steps of the process 700 need not be performed in the order shown and/or one or more steps of the process 700 need not be performed and/or can be replaced by other operations.

As illustrated in FIG. 7, at step 710, the electronic device 110 can receive contextual information from multiple data sources on the electronic device 110. In some aspects, the data sources may be implemented as the data sources 310 as described with reference to FIG. 3.

At step 720, the electronic device 110 can identify a predetermined pattern that is indicative of a particular activity in the contextual information within a time interval. In some aspects, the electronic device 110 can apply a sliding window along a user activity timeline. In some aspects, the sliding window represents a temporal range associated with an activity. In some implementations, the electronic device 110 can detect a time interval within the sliding window indicative of the activity by identifying the pattern corresponding to the activity within the contextual information associated with the user activity timeline.

At step 730, the electronic device 110 can determine a confidence score for the particular activity based at least in part on one or more confidence values of a corresponding activity signal associated with the time interval. In some aspects, the confidence score indicates a likelihood of an occurrence of the particular activity within the time interval. For example, the confidence score represents the chance that the detected activity is in fact the intended activity. In some implementations, the electronic device 110 can receive user activity information from multiple data sources associated with the time interval as evidence to calculate the confidence score for the particular activity. In some aspects, the electronic device 110 can calculate the confidence score for the activity based at least in part on the received user activity information.

At step 740, the electronic device 110 can determine whether the confidence score of the particular activity exceeds a confidence threshold. If the electronic device 110 determines that the confidence score exceeds the confidence threshold, then the process 700 proceeds to step 750. Otherwise, the process 700 proceeds back to step 720.

At step 750, the electronic device 110 can update a graph-based data structure by adding a representation of the particular activity as a node to the graph-based data structure based on the confidence score of the particular activity exceeding the confidence threshold. For example, if the likelihood is high enough to conclude that the detected activity is in fact the activity as intended, then the detected activity can be added as a node to the graph-based data structure. In some aspects, the graph-based data structure may include one or more interconnections between different nodes associated with different activities. In some aspects, these interconnections between the nodes representing different activities may occur based on a commonality in one or more contextual dimensions (e.g., temporal, spatial, activity, social, health, and the like) between entities. For example, there may be a common entity between the social and spatial dimensions of one or more life event datasets.

At block 760, the electronic device 110 can provide, for display on the electronic device, a user activity interface that provides access to an indexed collection of events organized by activity type by querying the graph-based data structure.

As described above, one aspect of the present technology is the gathering and use of data available from specific and legitimate sources for generating life events to construct a comprehensive mapping of routine events and extraordinary events in a user's life by way of temporal reasoning. The present disclosure contemplates that in some instances, this gathered data may include personal information data that uniquely identifies or can be used to identify a specific person. Such personal information data can include audio data, demographic data, location-based data, online identifiers, telephone numbers, email addresses, home addresses, biometric data or records relating to a user's health or level of fitness (e.g., vital signs measurements, medication information, exercise information, motion information, heartrate information workout information), date of birth, or any other personal information.

The present disclosure recognizes that the use of such personal information data, in the present technology, can be used to the benefit of users. For example, the personal information data can be used for generating smart temporal reasoning suggestions.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates aspects in which users selectively block the use of, or access to, personal information data. That is, the present disclosure contemplates that hardware and/or software elements can be provided to prevent or block access to such personal information data. For example, in the example of generating smart temporal reasoning suggestions, the present technology can be configured to allow users to select to "opt in" or "opt out" of participation in the collection and/or sharing of personal information data during registration for services or anytime thereafter. In addition to providing "opt in" and "opt out" options, the present disclosure contemplates providing notifications relating to the access or use of personal information. For instance, a user may be notified upon downloading an application that their personal information data will be accessed and then reminded again just before personal information data is accessed by the application.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level or at a scale that is insufficient for facial recognition), controlling how data is stored (e.g., aggregating data across users), and/or other methods such as differential privacy.

Therefore, although the present disclosure broadly covers use of personal information data to implement one or more various disclosed implementations, the present disclosure also contemplates that the various implementations can also be implemented without the need for accessing such personal information data. That is, the various implementations of the present technology are not rendered inoperable due to the lack of all or a portion of such personal information data.

Figure 8:
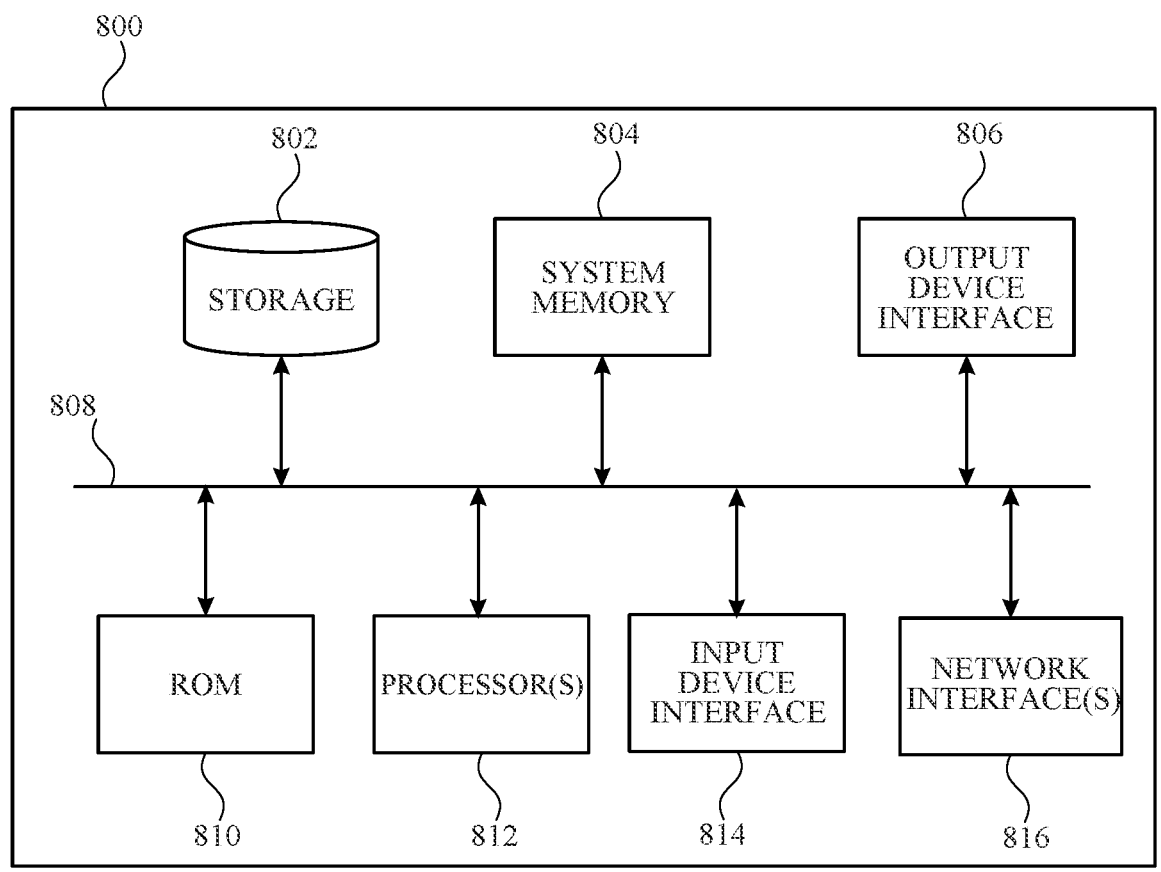
FIG. 8 illustrates an electronic system with which one or more implementations of the subject technology may be implemented.

FIG. 8 illustrates an electronic system 800 with which one or more implementations of the subject technology may be implemented. The electronic system 800 can be, and/or can be a part of, the electronic device 110, and/or the server 120 shown in FIG. 1. The electronic system 800 may include various types of computer readable media and interfaces for various other types of computer readable media. The electronic system 800 includes a bus 808, one or more processing unit(s) 812, a system memory 804 (and/or buffer), a ROM 810, a permanent storage device 802, an input device interface 814, an output device interface 806, and one or more network interfaces 816, or subsets and variations thereof.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations.

The ROM 810 stores static data and instructions that are needed by the one or more processing unit(s) 812 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a flash drive and its corresponding solid-state drive) may be used as the permanent storage device 802. Like the permanent storage device 802, the system memory 804 may be a read-and-write memory device. However, unlike the permanent storage device 802, the system memory 804 may be a volatile read-and-write memory, such as random-access memory. The system memory 804 may store any of the instructions and data that one or more processing unit(s) 812 may need at runtime. In one or more implementations, the processes of the subject disclosure are stored in the system memory 804, the permanent storage device 802, and/or the ROM 810. From these various memory units, the one or more processing unit(s) 812 retrieves instructions to execute and data to process in order to execute the processes of one or more implementations.

The bus 808 also connects to the input device interface 814 and output device interface 806. The input device interface 814 enables a user to communicate information and select commands to the electronic system 800. Input devices that may be used with the input device interface 814 may include, for example, alphanumeric keyboards and pointing devices (also called "cursor control devices"). The output device interface 806 may enable, for example, the display of images generated by electronic system 800. Output devices that may be used with the output device interface 806 may include, for example, printers and display devices, such as a liquid crystal display (LCD), a light emitting diode (LED) display, an organic light emitting diode (OLED) display, a flexible display, a flat panel display, a solid-state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 808 also couples the electronic system 800 to one or more networks and/or to one or more network nodes, such as the electronic device 110 shown in FIG. 1, through the one or more network interface(s) 816. In this manner, the electronic system 800 can be a part of a network of computers (such as a LAN, a wide area network ("WAN"), or an Intranet, or a network of networks, such as the Internet. Any or all components of the electronic system 800 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
   receiving contextual information from a plurality of data sources on an electronic device;
   identifying a predetermined pattern that is indicative of a particular activity in the contextual information within a time interval;
   transforming at least in part the contextual information associated with the particular activity by structuring the contextual information into a plurality of contextual dimensions of a life event dataset;

determining a confidence score for the particular activity based at least in part on one or more confidence values of a corresponding activity signal associated with the time interval, the confidence score indicating a likelihood of an occurrence of the particular activity within the time interval;

determining whether the confidence score of the particular activity exceeds a confidence threshold;

updating a graph-based data structure by adding the life event dataset as a node to the graph-based data structure based on the confidence score of the particular activity exceeding the confidence threshold, the graph-based data structure comprising an indexed collection of events structured by one or more interconnections between different nodes associated with different activities based on a commonality in one or more of the plurality of contextual dimensions between the life event dataset and at least one other life event dataset representing a different activity stored in the graph-based data structure to facilitate context-aware processing; and providing, for display on the electronic device, a user activity interface that provides access to the indexed collection of events organized by activity type for querying the graph-based data structure.

2. The method of claim 1, further comprising mapping the node to other nodes of the graph-based data structure that are representative of other activities based on the plurality of contextual dimensions associated with the particular activity, wherein the plurality of contextual dimensions comprises a temporal dimension, a spatial dimension, a social interaction dimension, or a health dimension.

3. The method of claim 1, wherein the identifying the predetermined pattern comprises applying one or more activity inference models.

4. The method of claim 1, wherein the identifying the predetermined pattern comprises applying a sliding window along a user activity timeline in the contextual information, wherein the sliding window represents a temporal range associated with the particular activity.

5. The method of claim 4, further comprising detecting a time interval within the sliding window indicative of the particular activity based on the identifying of the predetermined pattern.

6. The method of claim 5, further comprising receiving user activity information from a plurality of data sources associated with the time interval, wherein the confidence score for the particular activity is calculated based at least in part on the received user activity information, wherein the received user activity information includes the corresponding activity signal.

7. A device, comprising:
a memory; and
one or more processors configured to:
apply a sliding window along a user activity timeline, wherein the sliding window represents a temporal range associated with an activity;
detect a time interval within the sliding window indicative of the activity by identifying a pattern corresponding to the activity within contextual information associated with the user activity timeline;
transform at least in part the contextual information by structuring the contextual information into a plurality of contextual dimensions of a life event dataset;
receive user activity information from a plurality of data sources associated with the time interval;
calculate a confidence score for the activity based at least in part on the received user activity information, the confidence score indicating a likelihood of an occurrence of the activity within the time interval;
update a graph-based data structure with a node representing the life event dataset based on the confidence score exceeding a confidence threshold, the graph-based data structure comprising an indexed collection of events structured by one or more interconnections between different nodes associated with different activities based on a commonality in one or more of the plurality of contextual dimensions between the life event dataset and at least one other life event dataset representing a different activity stored in the graph-based data structure to facilitate context-aware processing; and
provide, for display on the device, a user activity interface that provides access to the indexed collection of events organized by activity type for querying the graph-based data structure.

8. The device of claim 7, wherein the sliding window is assigned with an activity inference model configured to detect the pattern corresponding to the activity.

9. The device of claim 7, wherein the user activity timeline is applied with a plurality of sliding windows with different lengths being associated with different activities.

10. The device of claim 7, wherein the one or more processors are further configured to map the node to other nodes of the graph-based data structure that are representative of other activities based on the plurality of contextual dimensions associated with the activity, wherein the plurality of contextual dimensions comprises a temporal dimension, a spatial dimension, a social interaction dimension, or a health dimension.

11. A non-transitory machine-readable medium comprising code that, when executed by a processor, causes the processor to perform operations comprising:
receiving contextual information from a plurality of data sources on an electronic device;
identifying a predetermined pattern that is indicative of a particular activity in the contextual information within a time interval;
transforming at least in part the contextual information associated with the particular activity by structuring the contextual information into a plurality of contextual dimensions of a life event dataset;
determining a confidence score for the particular activity based at least in part on one or more confidence values of a corresponding activity signal associated with the time interval, the confidence score indicating a likelihood of an occurrence of the particular activity within the time interval;
determining whether the confidence score of the particular activity exceeds a confidence threshold;
updating a graph-based data structure by adding the life event dataset as a node to the graph-based data structure based on the confidence score of the particular activity exceeding the confidence threshold, the graph-based data structure comprising an indexed collection of events structured by one or more interconnections between different nodes associated with different activities based on a commonality in one or more of the plurality of contextual dimensions between the life event dataset and at least one other life event dataset representing a different activity stored in the graph-based data structure to facilitate context-aware processing; and providing, for display on the electronic device, a user activity interface that provides access to the indexed collection of events organized by activity type for querying the graph-based data structure.

12. The non-transitory machine-readable medium of claim 11, wherein the operations further comprise mapping the node to other nodes of the graph-based data structure that are representative of other activities based on the plurality of contextual dimensions associated with the particular activity, wherein the plurality of contextual dimensions comprises a temporal dimension, a spatial dimension, a social interaction dimension, or a health dimension.

13. The non-transitory machine-readable medium of claim 11, wherein the identifying the predetermined pattern comprises applying one or more activity inference models.

14. The non-transitory machine-readable medium of claim 11, wherein the identifying the predetermined pattern comprises applying a sliding window along a user activity timeline in the contextual information, wherein the sliding window represents a temporal range associated with the particular activity.

15. The non-transitory machine-readable medium of claim 14, wherein the user activity timeline is applied with a plurality of sliding windows with different lengths being associated with different activities.

16. The non-transitory machine-readable medium of claim 14, wherein the operations further comprise detecting a time interval within the sliding window indicative of the particular activity based on the identifying of the predetermined pattern.

17. The non-transitory machine-readable medium of claim 16, wherein the operations further comprise receiving user activity information from a plurality of data sources associated with the time interval, wherein the confidence score for the particular activity is calculated based at least in part on the received user activity information, wherein the received user activity information includes the corresponding activity signal.

18. The method of claim 1, wherein the transforming provides a computational representation of a user life event context that encodes contextual relationships among the plurality of contextual dimensions.

19. The method of claim 1, further comprising:
receiving, via the user activity interface, user input comprising a query for retrieving activity information associated with the life event dataset from the graph-based data structure; and
providing, via the user activity interface, responsive to the query, the activity information associated with the life event dataset.

* * * * *